United States Patent [19]

Holzer

[11] Patent Number: 4,767,531

[45] Date of Patent: Aug. 30, 1988

[54] RETRACTOR FOR PERMEATOR OR FILTER MODULE

[75] Inventor: Joseph C. Holzer, Liverpool, N.Y.

[73] Assignee: Eastman Kodak Company, Rochester, N.Y.

[21] Appl. No.: 117,409

[22] Filed: Nov. 2, 1987

Related U.S. Application Data

[63] Continuation of Ser. No. 902,735, Sep. 2, 1986, abandoned.

[51] Int. Cl.4 ............................................. B01D 13/00
[52] U.S. Cl. ............................... 210/238; 210/321.83; 210/494.1
[58] Field of Search ................... 210/232, 238, 321.83, 210/450, 494.1

[56] References Cited

U.S. PATENT DOCUMENTS

| | | | |
|---|---|---|---|
| 2,642,187 | 6/1953 | Bell | 210/169 |
| 2,731,155 | 1/1956 | James | 210/169 |
| 2,822,201 | 2/1958 | Wood | 210/238 X |
| 3,189,179 | 6/1965 | McMichael | 210/238 |
| 3,504,796 | 4/1970 | Bray | 210/137 |
| 3,542,203 | 11/1970 | Hancock et al. | 210/321 |
| 3,568,843 | 3/1971 | Brown | 210/321 |
| 3,883,430 | 5/1975 | Codo | 210/238 X |
| 4,016,083 | 4/1977 | Sakaguchi et al. | 210/433.2 |
| 4,110,219 | 8/1978 | Maples | 210/245 |
| 4,301,013 | 11/1981 | Setti | 210/637 |

FOREIGN PATENT DOCUMENTS

| | | |
|---|---|---|
| 947841 | 8/1956 | Fed. Rep. of Germany . |
| 1932585 | 1/1971 | Fed. Rep. of Germany . |
| 2004472 | 4/1979 | United Kingdom . |

*Primary Examiner*—Frank Spear
*Attorney, Agent, or Firm*—Herman J. Strnisha

[57] ABSTRACT

A retractor handle is attached to the retraction end of a core wound permeator or filter module for withdrawing the module form its containment housing without requiring special tools. The retraction handle can be a resin pull ring flexibly attached to a flange of a plug that closes the retraction end of the core of the permeator or filter module. The retraction handle can also be a wire pull ring having ends seated in sockets formed in a plugged end region of the core.

6 Claims, 4 Drawing Sheets

RETRACTOR FOR PERMEATOR OR FILTER MODULE

This is a continuation of application Ser. No. 902,735, filed Sept. 2, 1986, now abandoned.

BACKGROUND OF THE INVENTION

1. Field of the Invention

This invention involves retractor handles, built into core wound permeator or filter modules, by which the modules can be withdrawn from their containment housings.

2. Description of the Prior Art

Core wound permeator or filter modules for reverse osmosis permeators and for filtration devices (examples of which are shown in U.S. Pat. Nos. 3,504,796; 3,568,843; and 4,301,013) have been difficult to remove from their containment housings. A seal typically surrounds and engages a module within its housing, and the seal resists against pulling the module axially out of its housing for replacement. Since the permeator or filter module occupies most of the space available within the containment housing, there is little room for fingers or tools to get a hold of the module for extracting it from its containment housing against the resistance of the seal that engages it.

One solution to this problem has been to tie a string around an end of the module so that the module can be withdrawn by pulling on the string. This has not worked well, because the string can break or become lodged in an unreachable place special tools for retracting modules from their housings. Since retraction tools are separate from the modules, they are easy to misplace and sometimes not available when needed.

SUMMARY OF THE INVENTION

I have discovered a simple and effective solution for this problem. I form a retraction handle that is built into a permeator or filter module and is available at a retraction end of the module for pulling the module out of its housing. I have devised a way of doing this so that the handle is strong enough for retracting the module and yet does not take up valuable space within the containment housing. My retraction handle is so inexpensive that it can be assembled into the module when it is manufactured and can be discarded with the module when it has finished its work. My retraction handle thus eliminates the need for any special or separate tools for removing modules from their housings.

In one preferred embodiment of my invention, I incorporate the retraction handle into a plug permanently fixed within an end region of a hollow core of the module where the plug blocks fluid flow from that end of the core while the module is in use. I form the plug handle as a flexible handle ring surrounding and joined to a flange of the plug and lying flat against a retraction end of the module where the handle does not take up any additional space. The handle can be lifted away from the end of the module and pulled axially of the core for withdrawing the module from its containment housing, after which the module is discarded, along with its handled plug. The plug is preferably molded of flexible resin material, and the force required to remove the plug from the core exceeds the force required for tearing the handle off the plug flange, which in turn exceeds the force required for withdrawing the module from its containment housing. The plug can also be made with a socket opening into the core to receive the end of an additional tube within the core. The junction region between the handle ring and the plug can extend radially outward into engagement with the containment housing so that when the handle is pulled away from the module, it leverages the loosening of the module from its housing seal.

In another preferred embodiment of my invention, I form the retraction handle as a wire pull ring, the ends of which are pivotally seated in sockets within a plugged end region of the core. The closure or plug blocking fluid flow from that end of the core is preferably recessed inward from the retraction end of the core, and sockets for the pull ring are preferably formed as holes through the core wall on a diameter of the core. The pull ring is shaped to lie flat against a retraction end of the module so as not to take up valuable space, and the pull ring can be lifted from the module and pulled axially of the module for retracting it from its housing.

DETAILED DESCRIPTION OF PREFERRED EMBODIMENTS

Figure 1:
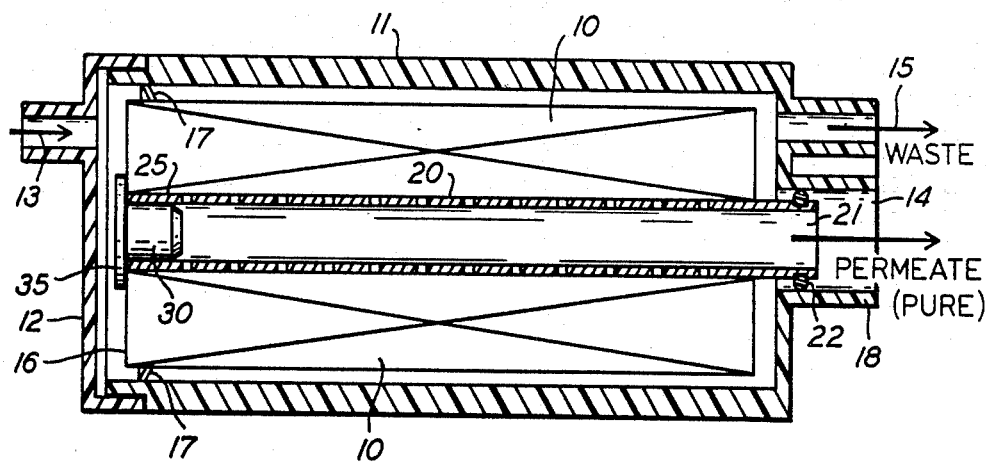
FIG. 1 is a partially schematic, side-elevational view of a permeator having a module supplied with a handled plug according to my invention.
Figure 3:
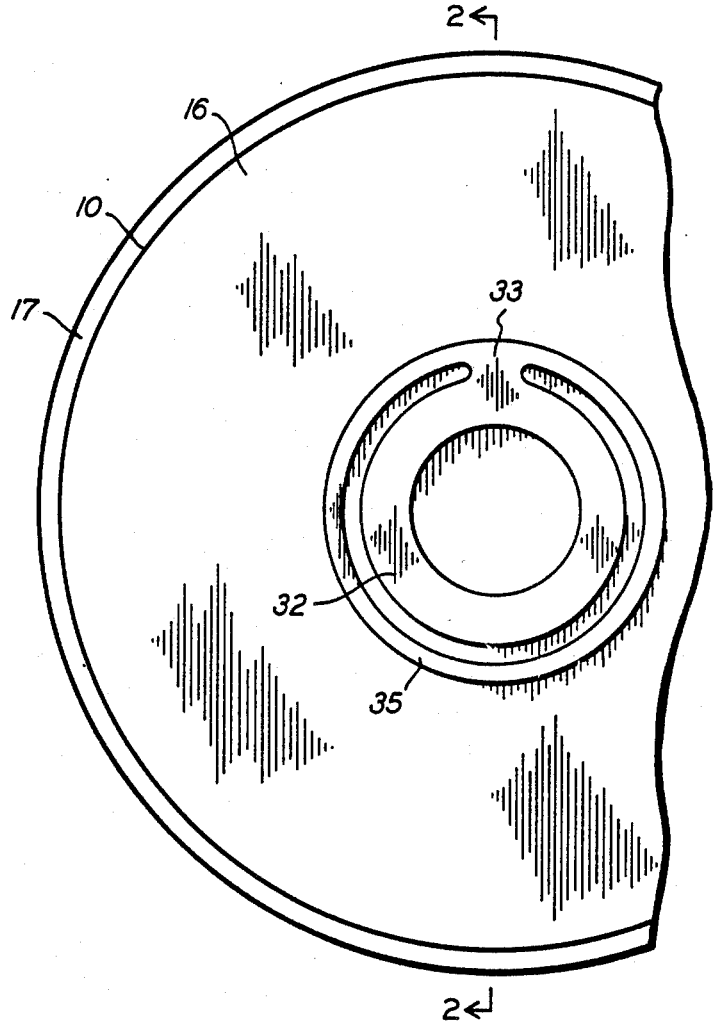
FIG. 3 is an elevational view of the plug end of the module of FIGS. 1 and 2.
Figure 2:
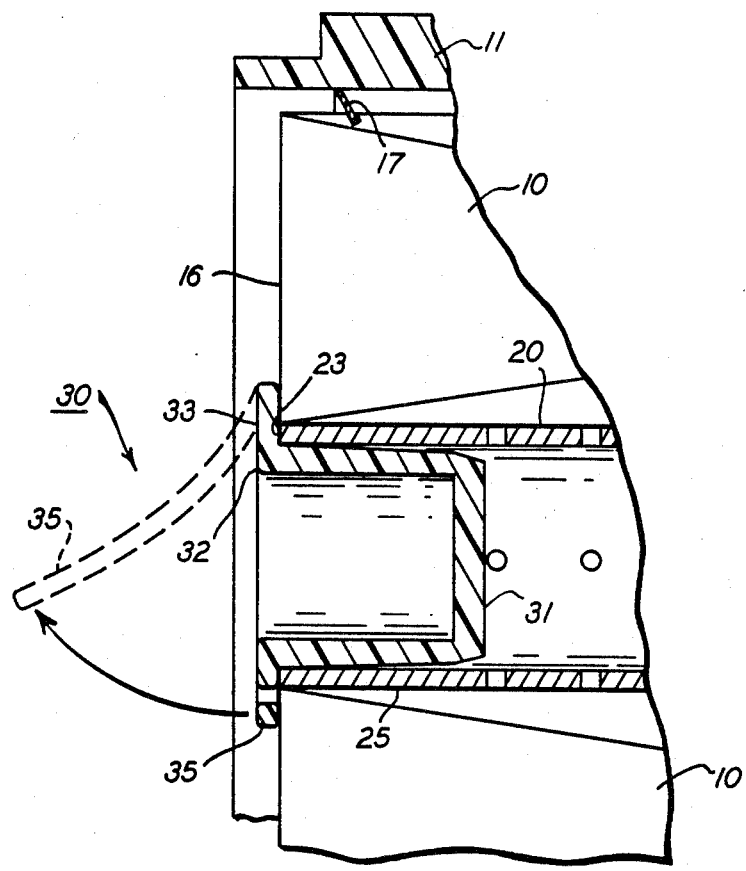
FIG. 2 is an enlarged, fragmentary cross-sectional view of the plug end of the permeator of FIG. 1, showing operation of the retraction handle.

The general environment for permeator or filter modules that can benefit from my invention is schematically shown in FIG. 1. Permeator module 10 has a fluid tight fit within seal 17 within containment housing 11 where module 10 is covered by an end cap 12 and operated to separate a liquid supply 13 into a pure permeate 14 and a waste concentrate 15. A fluid tight fit for end cap 12 on housing 11 can be attained by screwing end cap 12 to housing 11, or using external clamps or fasteners. A membrane for permeator module 10 is wound on perforated core 20, as is generally known, and an output end 21 of core 20 is sealed in the permeate discharge line 18 by an O-ring 22 that can be seated in a groove in the exterior surface of core 20 as illustrated, or seated in a groove in the interior surface of discharge line 18. In the embodiment of FIGS. 1-3, the other end region 25 of core 20 is closed by a plug 30 that includes a retraction handle according to my invention.

There are many other ways, besides the one shown in FIG. 1, that reverse osmosis permeators can be arranged within containment housings, fed with liquids, and supplied with output lines for pure permeate and concentrated brine. Modules suitable for a great many different arrangements can all be made with perforated core 20 on which an RO membrane is wound in a generally known way. Any of these core wound modules can benefit from my retraction handle to facilitate axial withdrawal of the module from its containment housing. Filtration modules can also use my invention, provided they have a core wound membrane or otherwise involve a filter element assembled on a hollow core.

Like known permeator and filter modules using core end closing plugs, plug 30, as shown in FIGS. 2 and 3, has a body tightly and permanently fitted within an end region 25 of core 20 where plug body 31 blocks fluid outflow from core 20. Plug 30 differs from known permeator and filter core plugs in having a retraction handle 35 flexibly attached to a flange 32 engaging the end 23 of core 20 and the end 16 of module 10. Plug 30 is preferably injection molded of a resilient resin material having the necessary strength, flexibility, and durability. I have found polypropylene to be satisfactory, but other resins can be used, and may be more desirable in some circumstances. The chosen resin must make the connection or junction region 33 between handle ring 35 and plug flange 32 flexible and strong enough to allow handle 35 to be lifted away from module end 16 and pulled axially of core 20 as shown by broken lines in FIG. 2 for axially withdrawing module 10 from its containment housing. To be sure that this occurs reliably, plug 30 is fitted tightly and securely within core end region 25. I prefer a pressed or hammered interference fit, but screw threads between plug body 31 and the inside of core 20 can be used. The fit between the core and the plug can also be strengthened by an adhesive formulated for use with specific materials forming the plug and the core. Other strengthening or bonding possibilities include fusion, spin welding, and solvent bonding. The desired result is that the force required to pull plug body 31 out of core 20 exceeds the force required to tear handle 35 away from plug flange 32, which in turn exceeds the force required to withdraw module 10 axially from seal 17 within containment housing 11 Then before handle 35 tears away from plug flange 32 and before plug body 31 pulls out of core 20, module 10 will loosen from seal 17 and move axially out of containment housing 11.

Figure 4:
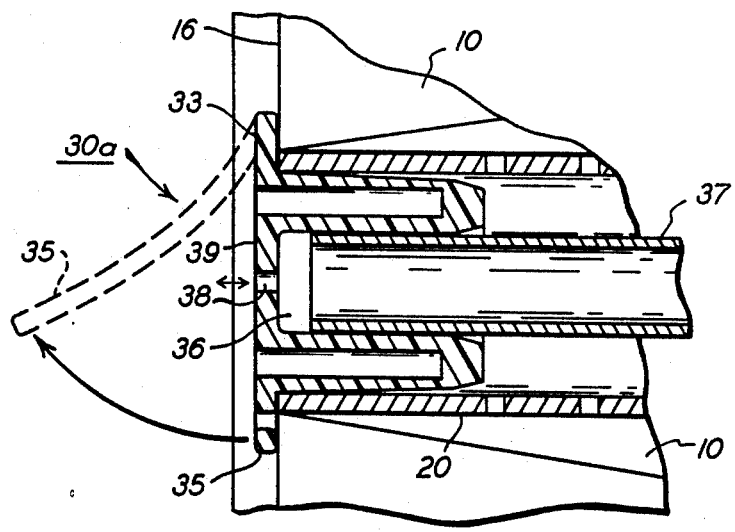
FIG. 4 is an enlarged, fragmentary cross-sectional view, similar to the view of FIG. 2, showing an alternative preferred embodiment of my handled plug, arranged to receive a tube within the core.
Figure 5:
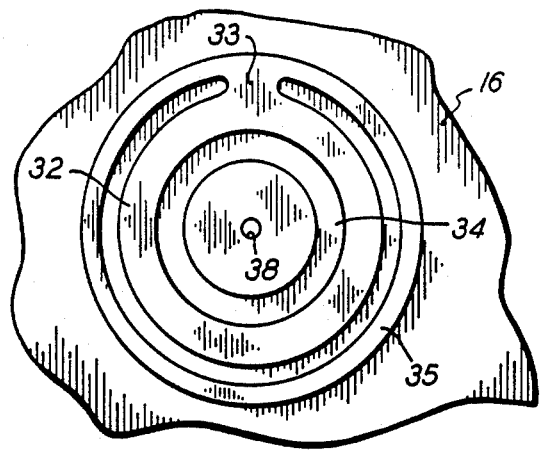
FIG. 5 is an end elevational view of the module of FIG. 4.

An alternative plug 30a, shown in FIG. 4, has a socket 36 opening into a somewhat larger core 20 where socket 36 receives the end of a tube 37. A recess 34 between core 20 and socket 36 saves material and allows some deformation to accommodate fluid-tight fits with both core 20 and tube 37. A passageway 38 allows fluid to flow through head 39 of plug 30a between tube 37 in socket 36 and the region within end cap 12 (FIG. 1). This can allow supply fluid to enter the end 16 of module 10 via tube 37 and plug passageway 38, or it can allow waste fluid from module end 16 to pass through plug passageway 38 and exit via tube 37. Except for the accommodation of tube 37, plug 30a is similar to plug 30 (FIG. 2) and includes handle 35 flexibly attached to plug flange 32 at a radially extending region 33.

Figure 6:
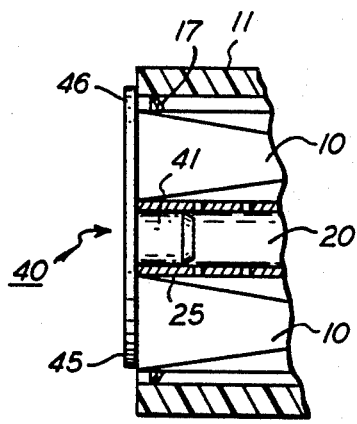
FIGS. 6 and 7 are fragmentary and partially cross-sectioned views of another preferred embodiment of a module having a retraction handle leveraged against the containment housing.
Figure 7:
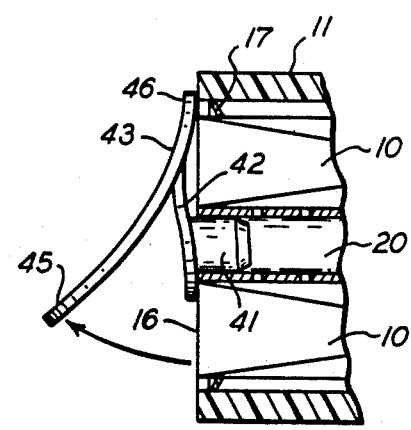
Figure 8:
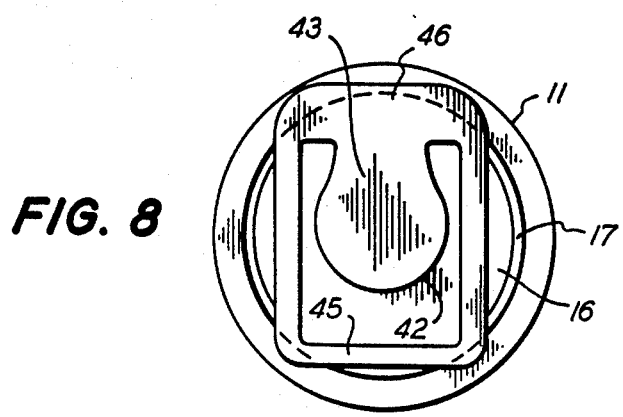
FIG. 8 is an end elevational view of the module of FIGS. 6 and 7.

Another alternative plug 40 with a leveraged handle 45 is shown in FIGS. 6 and 7. Plug 40 is similar to plugs 30 and 30a in having a body 41 that fits tightly within an end region 25 of core 20 and differs in having a fulcrum 46 extending radially beyond the junction region 43 between plug flange 42 and handle 45 so that fulcrum 46 can engage containment housing 11. As handle 45 is lifted away from module end 16 as shown in FIG. 7, fulcrum 46 braces against containment housing 11 while handle 45 pulls outward on junction region 43, exerting a leveraged axial pull on plug flange 42 and body 41. This leveraged axial pull on plug 40 helps loosen module 10 from the grip of seal 17 to initiate an axial withdrawal, the remainder of which proceeds with a smaller force requirement supplied by an axial pull on handle 45 in the same way that modules 10 are retracted by plug handles 35 (FIGS. 2 and 4).

Handles 35 and 45, when not in use, lie flat against retraction ends 16 of modules 10 so that handles 35 and 45 do not take up valuable space under end cap 12 within containment housing 11. This prevents any sacrifice of the effective working area of module 10 to accommodate a retraction handle Handles 35 and 45 can be formed integrally with plugs 30, 30a and 40 by injection molding, which I prefer because it makes the handles so inexpensive that they can be discarded along with the used modules 10. Handles for core plugs can also be made separately of metal or resin materials and mechanically attached to plug bodies or flanges.

Figure 9:
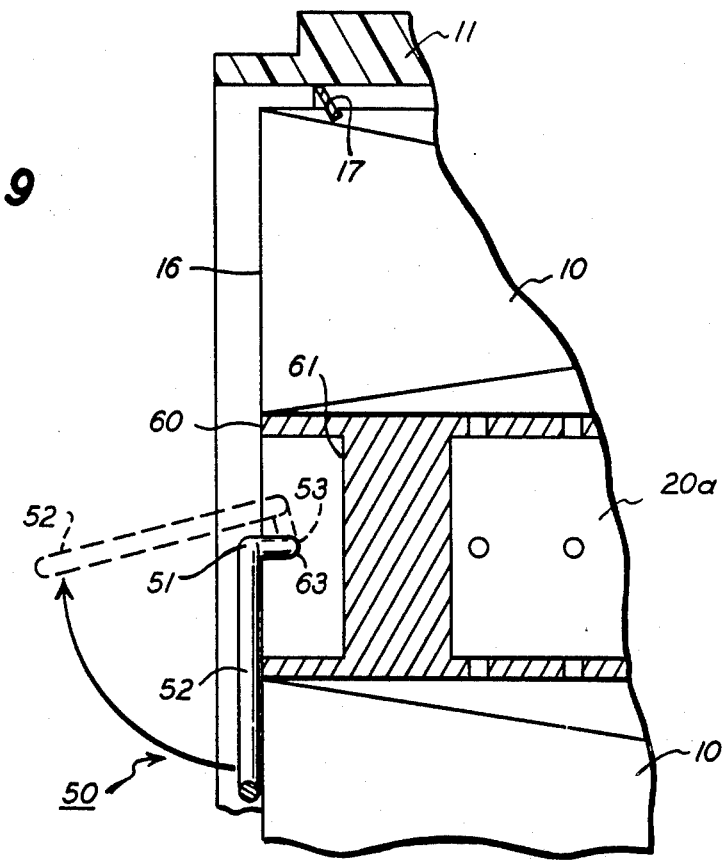
FIG. 9 is a fragmentary side elevational view, similar to the view of FIG. 2, showing a preferred alternative of a retraction handle attached to a plugged end region of a module core.
Figure 10:
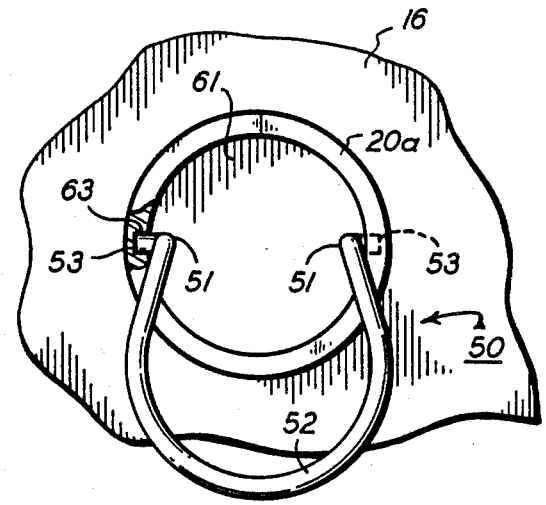
FIG. 10 is a fragmentary end elevational view of the embodiment of FIG. 9.

Another preferred embodiment of a retraction handle 50 is shown in FIGS. 9 and 10. Perforated core 20a has a retraction end region 60 that is closed or plugged by a barrier 61, which can be integrally formed with core 20a as illustrated, or can be a separate plug pushed into retraction end 60 of core 20a. Either way, retraction end 60 is preferably recessed adjacent plug or barrier 61 to accommodate retraction handle 50. This is preferably formed as a wire or resin pull ring 52 having a bend 51 arranged so that pull ring 52 normally lies flat against retraction end 16 of module 10. Ends 53 of handle 50 are preferably seated in sockets 63 formed in the wall of core 20a. Handle ends 53 preferably pivot within sockets 63, which are preferably formed as holes through the wall of core 20a on a diameter of core 20a. Handle 50, like handles 35 and 45, can be lifted away from retraction end 16 of module 10 and pulled axially of core 20a for withdrawing module 10 from housing 11. Handle 50 has both a pivotal and strong connection with core 20a to which handle 15 can be easily attached by springing legs 53 inward and seating them within sockets 63 in the plugged end 60 of core 20a.

I claim:

1. In a permeator module of the type adapted to be mounted within a filtration-system housing and of the type having a membrane wound on a core having an open-end region, a plug-retractor device comprising:
   (a) a plug having a body tightly fitted within said open-end region of said core to secure it to said core sufficient to withstand the force required to remove the module from said housing; and
   (b) a retraction handle formed as a ring integrally attached to a head of said plug, the arrangement being such that, when sufficient force is applied to said handle, said module is removed from said housing.

2. The retractor of claim 1 wherein said body, head, and ring are molded of a flexible resin material.

3. The retractor of claim 2 wherein the force holding said body within said core is larger than the force applied to said body by pulling on said flexible ring, which in turn is larger than a force tending to hold said module within said housing.

4. The retractor of claim 1 wherein said body has a socket for receiving an end region of a tube arranged within said core.

5. The retractor of claim 4 wherein said head has a through opening communicating with said socket.

6. The retractor of claim 1 wherein the attachment of said ring and said head occurs in a region spaced between said core and said housing around said module, and said ring extends radially from said attachment region to the region of said housing around said module and is fixed to said plug and has a portion which engages the housing so as to serve as a fulcrum for leveraging the initial withdrawal of said module from said housing.

* * * * *